United States Patent [19]
Schrum

[11] Patent Number: 5,799,403
[45] Date of Patent: *Sep. 1, 1998

[54] STANDOFF CROWN MEASUREMENT DEVICE

[76] Inventor: Paul T. Schrum, P.O. Box 28726, Raleigh, N.C. 27611

[*] Notice: The term of this patent shall not extend beyond the expiration date of Pat. No. 5,631,732.

[21] Appl. No.: 771,180

[22] Filed: Dec. 20, 1996

Related U.S. Application Data

[63] Continuation of Ser. No. 492,790, Jun. 20, 1995, Pat. No. 5,631,732.
[51] Int. Cl.$^6$ .................................................. G01C 5/00
[52] U.S. Cl. ................ 33/290; 33/521; 33/DIG. 21; 250/559.13; 356/376
[58] Field of Search .......................... 33/281, 282, 286, 33/290, 293, 521, 523, DIG. 21; 73/146; 250/578.1, 559.12, 559.13, 559.27; 356/138, 141, 147, 372, 375, 376, 399

[56] References Cited

U.S. PATENT DOCUMENTS

| | | | |
|---|---|---|---|
| 3,659,949 | 5/1972 | Walsh et al. | 356/376 |
| 4,338,031 | 7/1982 | Miller et al. | 356/397 |
| 4,693,598 | 9/1987 | Sehr | 33/293 |
| 4,718,171 | 1/1988 | Schlemmer et al. | 33/DIG. 21 |
| 4,916,823 | 4/1990 | Kunze | 33/521 |
| 5,189,484 | 2/1993 | Koschmann et al. | 356/138 |
| 5,331,745 | 7/1994 | Jager | 33/DIG. 21 |
| 5,631,732 | 5/1997 | Schrum, Jr. | 33/521 |

FOREIGN PATENT DOCUMENTS

| | | | |
|---|---|---|---|
| 62-215816 | 9/1987 | Japan | 33/521 |
| 666349 | 7/1988 | Switzerland | 33/521 |
| 888852 | 2/1962 | United Kingdom | 33/521 |

*Primary Examiner*—G. Bradley Bennett
*Attorney, Agent, or Firm*—Rhodes, Coats & Bennett, L.L.P.

[57] ABSTRACT

This invention is a method for remotely obtaining roadway crown point elevation and horizontal location based on projecting a horizontal laser beam configured vertically in either a continuous or discrete manner across the roadway surface at a predetermined elevation substantially coincident with the crown point of the roadway. The highest elevation of the roadway partially occludes the vertically configured laser beam. The lowest elevation of the laser beam which contacts an array of vertically configured laser receivers positioned on the opposite side of the roadway is by necessity the highest elevation of the roadway crown. By using an optical detector at a known vertical offset from the laser beam emitter, the angle and hence the distance can be determined to the furthest laser impact with the roadway. This distance information can be combined with the known line between the laser emitter and laser receivers to resolve the horizontal coordinates of that point. In the case where the roadway is found in transition from normal straight roadway to curved roadway, the present method may be modified to calculate the slope of individual segments of the roadway on either side of a break point in order to determine the horizontal location of the break point. The laser apparatus and related components may be integrated into a total station package for automated calculation and derivation of data for input into a data collector.

28 Claims, 7 Drawing Sheets

STANDOFF CROWN MEASUREMENT DEVICE

RELATED APPLICATION

This is a continuation of application Ser. No. 08/492,790 filed on Jun. 20, 1995, now U.S. Pat. No. 5,631,732, issued May 20, 1997, for the invention entitled Surveyor Device.

FIELD OF INVENTION

This invention relates to surveying instruments and more particularly to a surveying device utilizing a laser to accurately define roadway elevations.

BACKGROUND OF INVENTION

When determining paving quantities, resurfacing grades, side-road tie-in grades, or making other design decisions, roadway design engineers must know the elevations of the roadway at three important locations of the roadway profile. These are the left edge of the pavement, the crown point, and the right edge of the pavement.

Presently, the most economical way for surveyors to gather this information is by using a total station package in which a device including a theodolite, an electronic distance meter and an electronic data collector is fixed over a known ground control point. The horizontal coordinates and elevation of the desired points on the roadway profile are determined by sighting light reflecting prisms which are positioned at the top of poles of controlled heights. Using this conventional scheme, a high level of accuracy may be achieved relatively quickly and efficiently in obtaining the necessary data.

However, as traffic volumes increase due to population growth and related factors, it is becoming more difficult and hazardous for surveyors to access elevation measurements in the middle of the roadway. In some cases injury to the surveyor or vehicle occupant results. In some instances time consuming roadway closures are the result. In other cases, the design engineer may be forced to complete the project without the benefit of roadway point elevations at all.

CONCISE EXPLANATION OF PRIOR ART

U.S. Pat. No. 5,189,484 to Eric C. Koschmann discloses a laser beam detector system utilized to define an elevation or grade.

U.S. Pat. No. 3,659,949 to Robert R. Walsh, et al. discloses a laser beam system for detecting and measuring perametric deviations between surfaces including laser targets on opposite sides of a roadway.

U.S. Pat. No. 5,141,307 to Michael L. Bennett discloses a surveying method using a laser-type surveying method for measuring roadway surfaces.

U.S. Pat. No. 3,846,026 to Kenneth H. Waters discloses a surveying method and apparatus for determining various parameters utilizing projected energy beams.

U.S. Pat. No. 4,695,163 to Ronald A. Schachar discloses a method and apparatus for determining the shape of an object utilizing a laser light source.

U.S. Pat. No. 4,214,373 to William R. Vessey discloses a grade checker for determining the elevation of a grade relative to a pair of reference points on opposite sides of the grade.

Finally, U.S. Pat. No. 4,490,919 to Wieland Feist is considered of general interest in that it relates to an arrangement for measuring the elevations of terrain points.

BRIEF DESCRIPTION OF INVENTION

After much research and study into the above mentioned problems, the present invention has been developed to provide a method for remotely obtaining roadway crown point elevation and horizontal location based on projecting a horizontal laser beam configured vertically in either a continuous or discrete fashion across the roadway surface. The highest elevation of the roadway partially occludes the vertically configured laser beam. The lowest elevation of the laser beam which reaches the laser receiver positioned on the opposite side of the roadway is by necessity the highest elevation of the roadway crown.

By using optical detector equipment at a known vertical offset from the laser beam emitter, the angle and hence the distance can be determined to the furthest laser impact with the roadway. This distance information can be combined with the known line between the laser emitter and laser receivers to resolve the horizontal coordinates of that point.

In the case where the high edge of pavement elevation is higher than the cross-slope break point formed continuously from the crown, by utilizing strobing or some other method for giving a unique identity to each discrete beam in the vertically configured laser, the elevation and offset of the cross-slope break point can be determined by measuring angles from optical detector equipment at a known vertical offset from the laser beam emitter.

In the case where the high edge of pavement elevation is higher than the cross-slope break point usually formed continuously from the crown, by deliberately varying, the angle at which the lowest beam is emitted until it is occluded by that break point, the lowest elevation at which the beam reaches the laser receivers can be used to determine the elevation of the break point. Results from the measurements can be relayed to a data collector via voice communication or by telemetry carried over laser or radio transmission.

The laser emitter apparatus and the related components described herein may be integrated into a total station package for automated calculation and derivation of data for input into the data collector.

In view of the above, it is an object of the present invention to provide the means to remotely determine the elevation and horizontal position of the crown point of a roadway surface without endangering the surveyor or the traveling public and without impeding normal traffic flow.

Another object of the present invention is to provide roadway design engineers and surveyors with a highly accurate means of determining critical locations of the roadway cross-section.

Another object of the present invention is to provide a laser apparatus that can be integrated into existing total station arrangements with relatively minor modifications to that existing equipment, thereby providing a cost effective means of retrofitting existing total station packages already in use.

Another object of the present invention is to provide a laser apparatus wherein survey measurements can be relayed to a data collector via voice communication or by telemetry carried over laser or radio transmission.

Another object of the present invention is to provide a relatively simple laser apparatus wherein employee training for correct implementation will be minimal and that trouble shooting by field personnel is greatly facilitated.

Another object of the present invention is to provide a laser apparatus wherein the components are relatively simple and light weight and thus inventories of replacement parts may be conveniently maintained.

Another object of the present invention is to provide a laser surveying apparatus which would incorporate snap-and-go design features for attachment and integration of the various components.

Other objects and advantages of the present invention will become apparent and obvious from a study of the following description and the accompanying drawings which are merely illustrative of such invention.

DETAILED DESCRIPTION OF INVENTION

Figure 1:
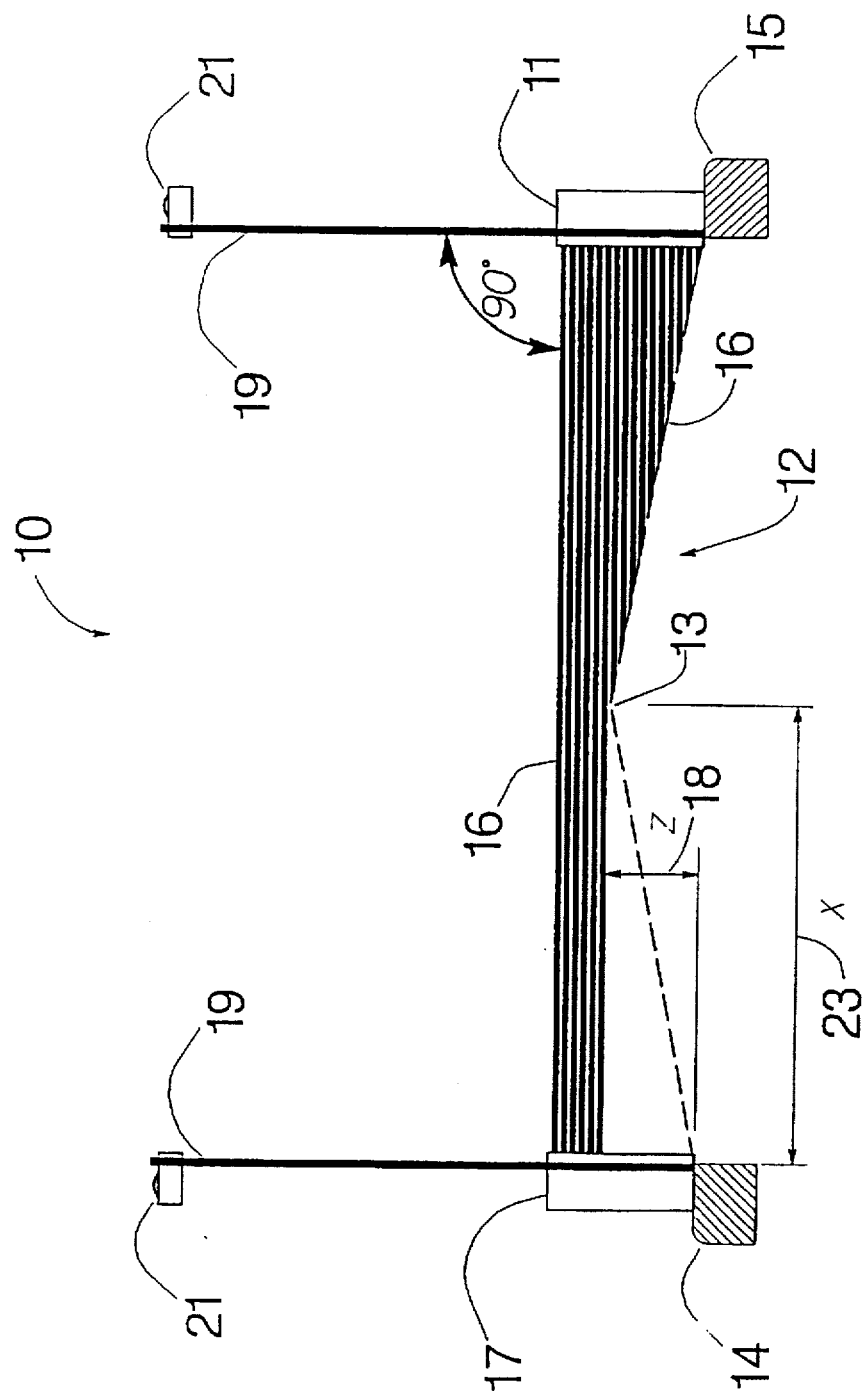
FIG. 1 is an elevational view of the present invention showing vertically configured laser beams in functional relation to a straight roadway cross-section.

With further reference to the drawings, a laser apparatus for remotely determining roadway crown elevation in accordance with the present invention is illustrated in FIG. 1, indicated generally at 10. A laser beam emitter 11 is positioned on one edge of a roadway, indicated generally at 12, which is depicted in cross-sectional profile in FIG. 1. Roadway 12 includes a crown point 13 which is of a higher elevation than either the left edge of pavement 14 or the right edge of pavement 15.

In the preferred embodiment of the present invention, laser light beams 16 projected from laser beam emitter 11 are perfectly horizontal and directed toward laser receivers 17, which are positioned directly across roadway 12 from laser beam emitter 11.

Because there is a point on roadway 12 higher in elevation than the lowest level of laser emitter 11, some of the vertically configured laser beams 16 are blocked by roadway 12. Laser receivers 17 detect all of the laser beam 16 that passes above crown point 13 having circuitry to detect which of these laser beams 16 is the lowest elevation. The distance from the low point of detector 17 to the low point of laser light beam 16 may be calculated and designated as length Z 18 as indicated in FIG. 1.

Further, if the elevation of the low point of laser receivers 17 is known, the value of length Z 18 may be added to it to determine the elevation of crown point 13 of roadway 12. It will be appreciated that the horizontal distance designated as length X 23 from the edge of pavement to crown point 13 cannot be determined from this method.

In the preferred embodiment of this system, laser beam emitter 11 and laser receivers 17 are attached to an end of prism poles 19. The manufacturer would ensure that laser light beams 16 would be projected from laser emitter 11 perpendicular to prism poles 19 within specified tolerances.

Figure 2:
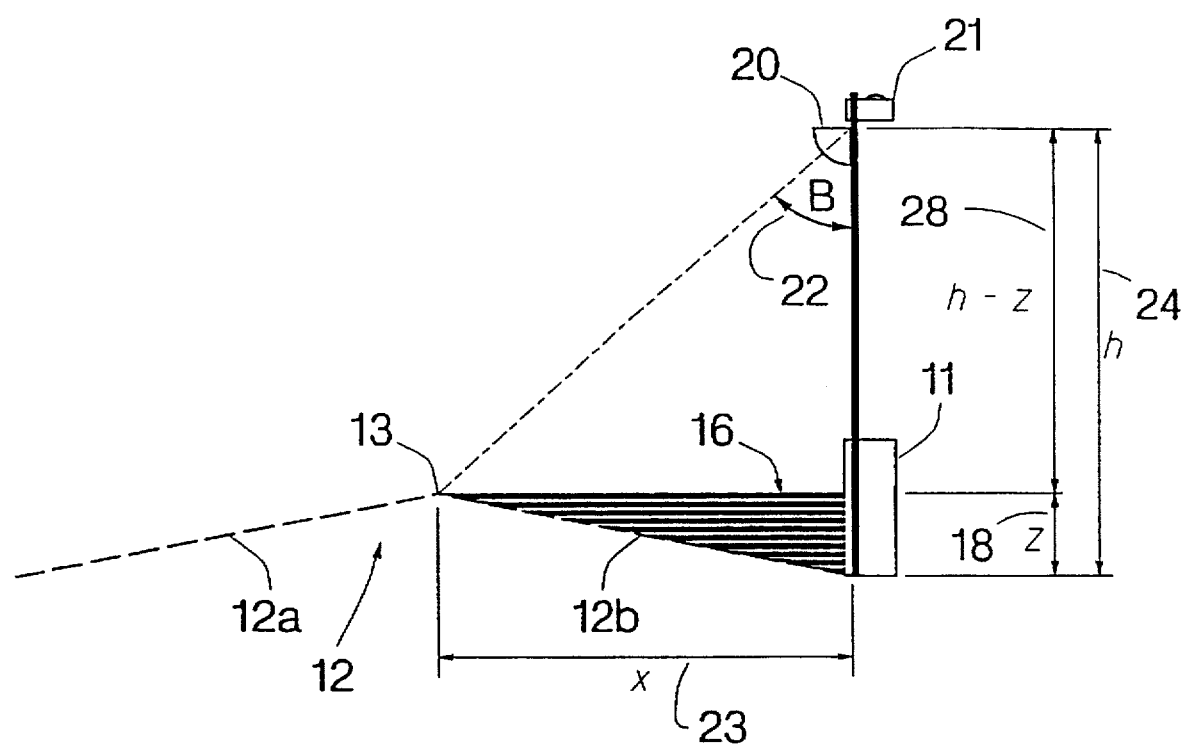
FIG. 2 is an elevational view of the present invention showing the vertically configured laser beam in combination with an optical detector at a known vertical offset in functional relation to a straight roadway cross-section.

As illustrated in FIG. 2, prism poles 19 may have mounted thereon at an opposite end an optical detector 20, which functions to determine the points at which laser illumination is observed on roadway 12. Further, with prism pole 19 being held vertical with the aid of a leveling bubble 21, optical detector 20 determines the angle B 22 at which the laser illumination is observed, as shown in FIG. 2.

Thus it will be appreciated that the horizontal position of crown point 13, designated as length X 23, may now be accurately determined using the laser apparatus of the present invention as shown in FIG. 2. The far side 12a of the crown roadway 12 is in the shadow of laser beam emitter 11 and is not illuminated by it. The near side 12b of roadway 12 is struck by the laser beams 16 which are blocked by roadway 12. It will be appreciated that crown point 13 is the point of roadway 12 furthest from laser beam emitter 11 that is illuminated by laser beams 16.

With prism poles 19 being held vertical or plumb with the aid of leveling bubbles 21, optical detector 20 determines the angle B 22 at which laser illumination is observed.

The vertical height h 24 of optical detector 20 above laser emitter 11 is a known distance. With the value of length Z 18 having been previously determined by the method described in FIG. 1, and with height h 24 known, the value h 24 minus Z 28 can be calculated. Then, the position of crown point 13 designated by horizontal length X 23 can be computed using trigonometry.

The value of horizontal length X 23 is actually an intermediate value necessary to calculate the relative horizontal position (Northing and Easting) of the crown point 13, in accordance with standard surveying methods.

Figure 3:
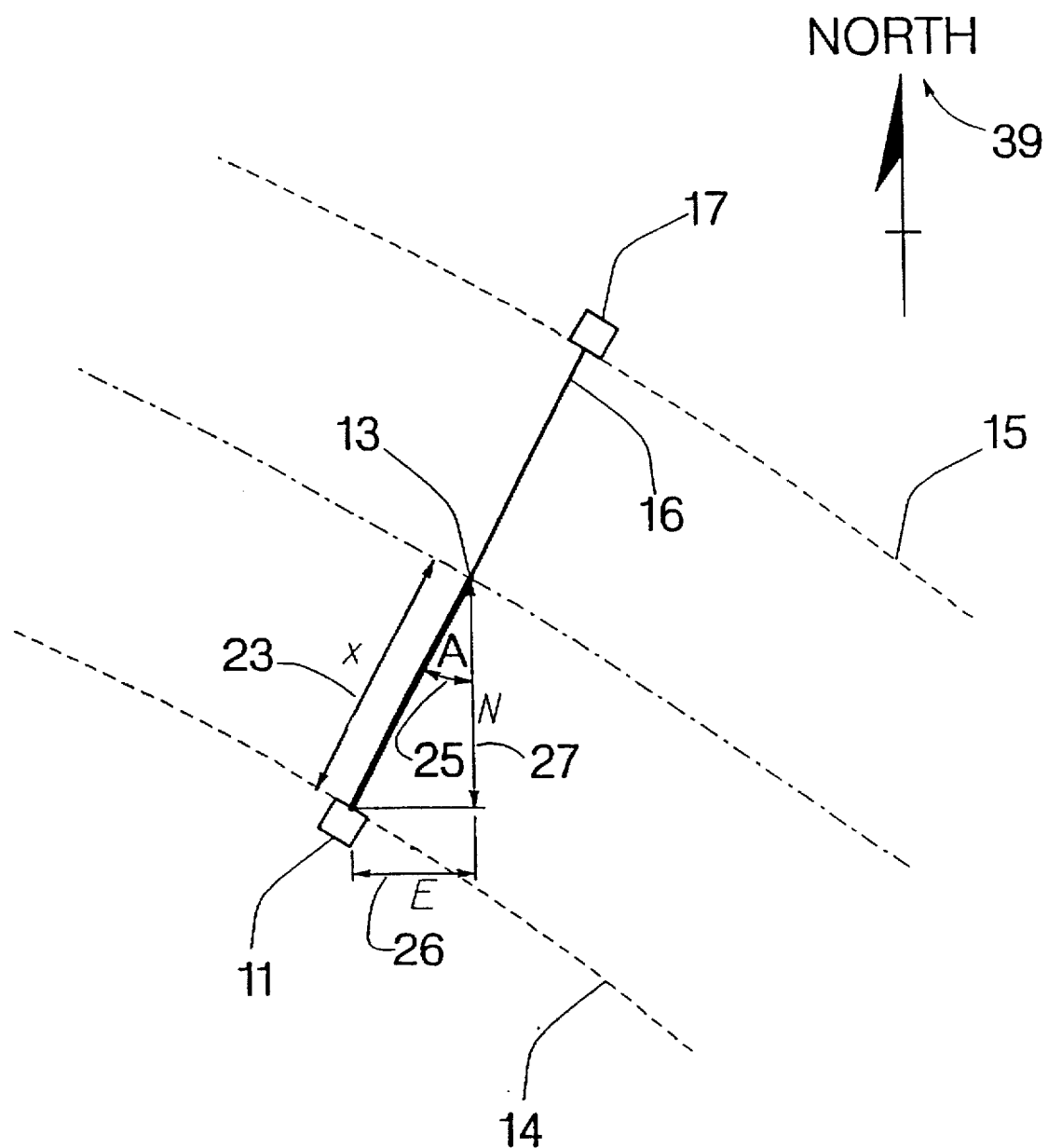
FIG. 3 is a top plan view of the present invention shown in functional relation to a roadway surface, including a North compass indicator.

Referring now to FIG. 3, with horizontal length X 23 known from the procedure in FIG. 2, the angle A 25 of the laser beams 16 in relation to North on the survey map can be computed from the previously known coordinates of laser emitter 11 and laser receivers 17 using trigonometry. Thus, with length X 23 and angle A 25 now known, the relative horizontal position, designated by value E 26 and value N 27 in relation to true North, can be computed and added to the database. Directional indicator, indicated generally at 39, is shown in FIG. 3 for reference.

The above methods describe procedures for determining elevation and horizontal position only for the case where there is a crown point 13 in the roadway 12 higher than both edges of pavement.

Figure 4:
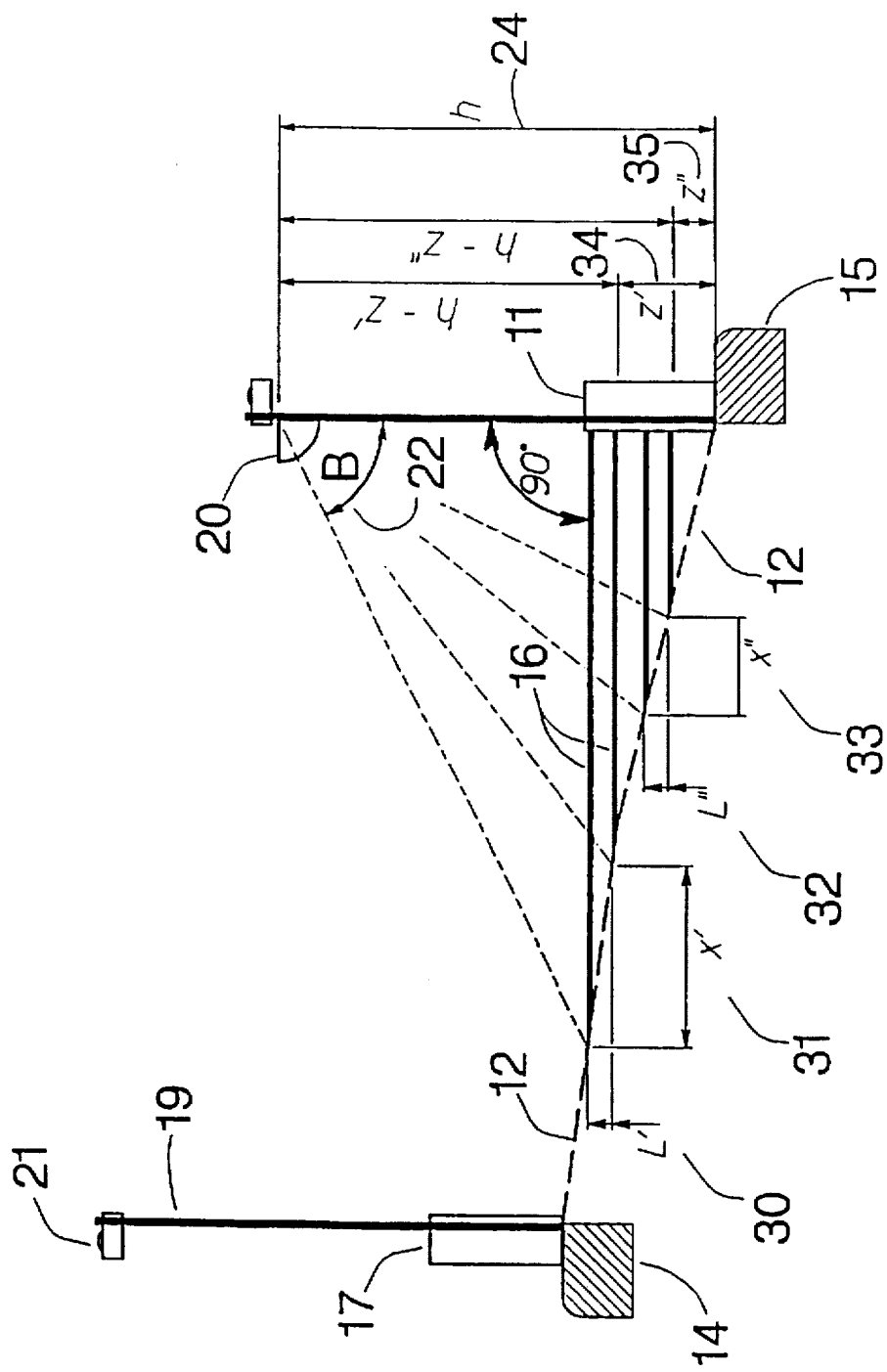
FIG. 4 is an elevational view of the present invention using discrete laser beams and an optical detector positioned at a known vertical offset shown in functional relation to a transitional roadway cross-section where the high edge of pavement elevation is higher than the break point.

Approximately 2% to 10% of the typical roadway is found in the transition from straight roadway to curved roadway. During this transition, as shown in FIG. 4, one edge of pavement is higher than the break point 29, previously designated crown point 13 in the straight roadway case. However, in contrast to the straight roadway example, the slope from one edge of pavement to the break point 29 is not the same as the slope from the break point 29 to the other edge of pavement as illustrated in FIG. 4.

As will be appreciated by referring to FIG. 4, laser receivers 17 on the left edge of pavement 14 are at a higher elevation than break point 29 of the roadway 12, but the slope from the left edge of pavement 14 to break point 29 is at a different rate than the slope from the break point 29 to the right edge of pavement 15.

The method shown in FIG. 4 uses discrete identifiable laser beams 16 at known elevations and an optical detector 20 at a known vertical height above laser beam emitter 11 to determine the slope of the pavement on either side of break point 29. The slope on either side of break point 29 is determined by the method hereinafter described.

Two discrete identifiable laser beams 16 are projected onto roadway 12 with a known difference in elevation, designated as length L' 30. Using the method described for FIG. 2, length X' 31 is computed using optical detector 20 to measure the related angle B 22 and using the related length Z' 34 for this segment of roadway 12. These data are then used to calculate the slope on that segment of roadway 12 corresponding to length X' 31.

Similarly, two different identifiable laser beams 16 are projected onto roadway 12 with a known difference in elevation designated as length L" 32. Again, the method of FIG. 2 is utilized to compute length X" 33 by using optical detector 20 to measure the greatest angle B 22 and the related length Z" 35 for this segment of roadway 12 in order to calculate the slope on each side of break point 29. From this information and the known locations of edges of pavement, the elevation and horizontal location of break point 29 can be determined.

Figure 5:
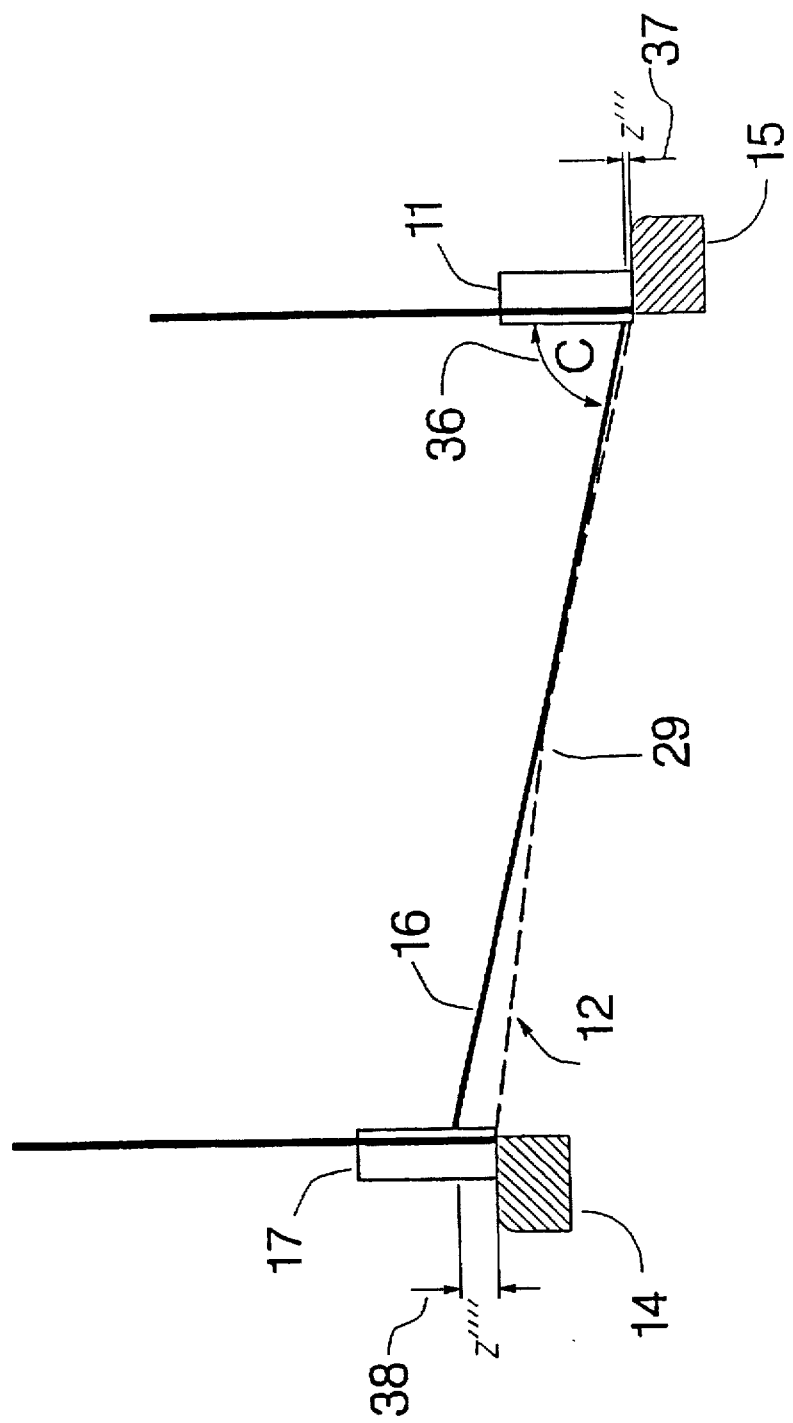
FIGS. 5 and 6 are elevational views of the present invention disposed in functional relation to a transitional roadway cross-section illustrating alternative placement of laser emitters and laser receivers.
Figure 6:
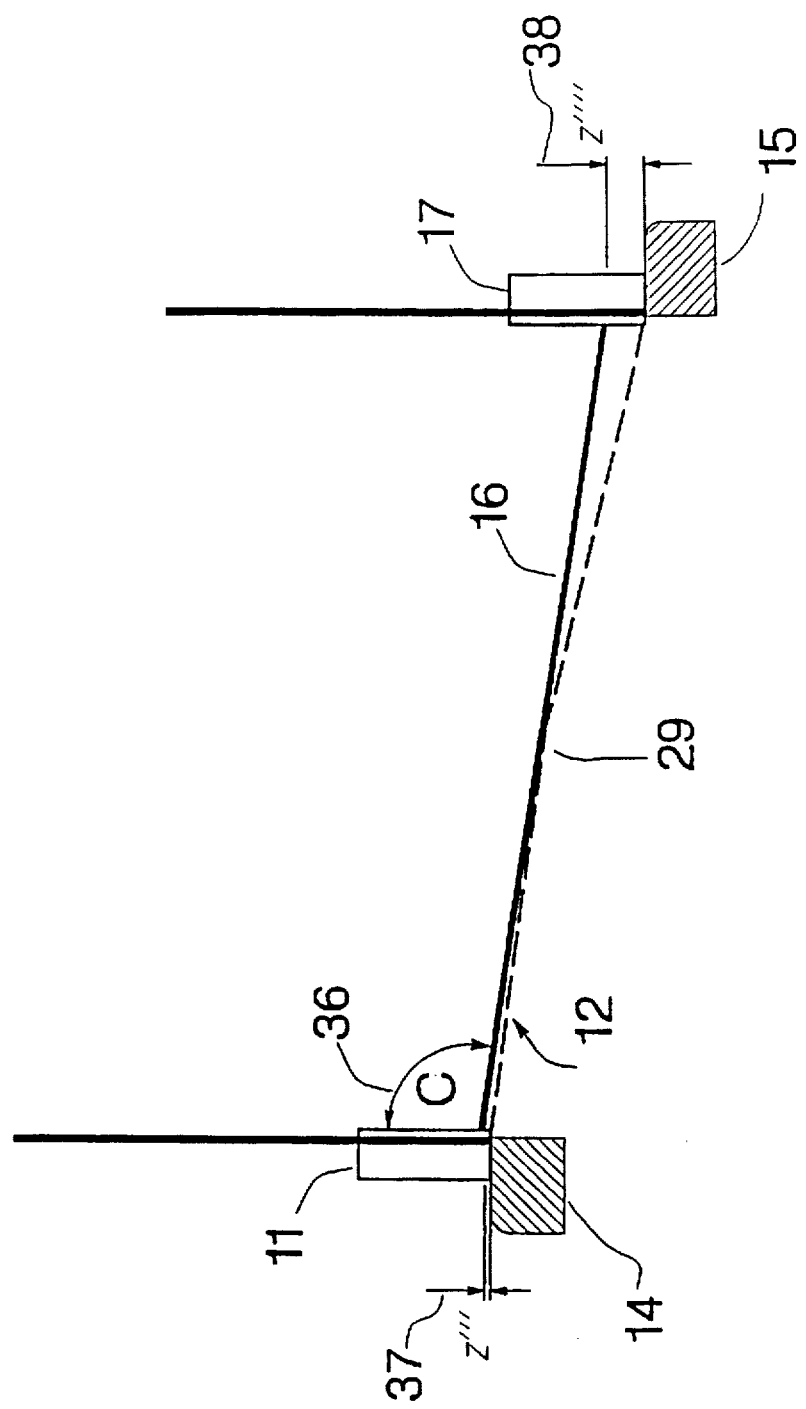

An alternative method of determining the break point 29 of the transitional roadway described above is illustrated in FIGS. 5 and 6. The method of FIGS. 5 and 6 uses laser emitters 11 which can project laser light beams 16 at varying angles to vertical. As shown in FIGS. 5 and 6, laser beams 16 are blocked by break point 29 of roadway 12 up to a specific angle C 36. By deliberately varying angle C 36 at which laser beam 16 is projected from laser emitter 11 until it is occluded by break point 29, the lowest elevation at which laser beam 16 reaches laser receiver 17 can be used to derive the elevation of break point 29.

The relative elevation Z''' 37 of the origin of laser beams 16 and the relative elevation Z"" 38 at the location where laser beams 16 strike laser receivers 17 can be utilized with the coordinates of the edges of the pavement to compute a line along which break point 29 will lie.

Figure 7:
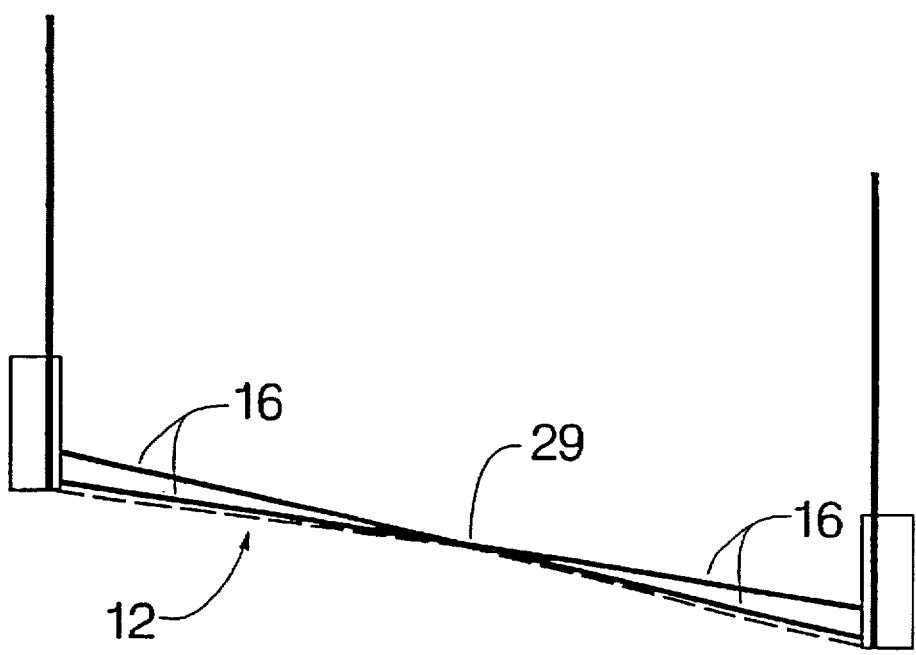
FIG. 7 is a composite elevational view of the plotted lines obtained by the method illustrated in FIGS. 5 and 6.

As shown in FIG. 6 another laser emitter 11 projecting from the opposite side of roadway 12 to another array of laser receivers 17, using the same procedure can determine another line along which break point 29 lies. These two lines can then be used to calculate the horizontal and vertical coordinates of break point 29 as illustrated in FIG. 7.

In the case of a fully elevated curved roadway where one edge of pavement is higher than the other edge there is a single, continuous slope from one edge of pavement to the other, the elevation at the mid-point of the roadway can be calculated by using the known slope from one edge of the pavement to the other. In this instance, no special laser apparatus is required.

From the above it can be seen that the present invention provides the means to remotely determine the elevation and horizontal position of the crown point of the roadway without endangering the surveyor or impeding normal traffic.

Further, the present invention may be adapted to accurately measure straight and transitional roadway surfaces and it can be integrated into existing total station packages with relatively minor modifications to that equipment. Thus, the system of the present invention may be retrofitted to total survey stations already in use and sold at a price comparable to other elements of a total station package.

Finally, since the inventive concept is relatively simple, employee training will be minimal and trouble shooting of problems by field personnel is greatly facilitated.

The terms "top", "above", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method for surveying a roadway comprising:
    a) projecting a laser beam across the roadway from one side thereof so that the laser beam intersects a crown in the roadway; and
    b) determining the elevation of the laser beam at the point where the laser beam intersects the crown to obtain the elevation of the crown.

2. The method of claim 1 wherein the step of determining the elevation of the laser beam includes receiving the laser beam on the opposite side of the roadway from where it is transmitted.

3. The method of claim 2 wherein the step of determining the elevation of the laser beam includes varying the elevation of the laser beam and determining the lowest elevation at which the beam is received at the opposite side of the roadway.

4. The method according to claim 3 wherein a plurality of discrete laser beams are projected across the roadway at different elevations.

5. The method according to claim 3 wherein a single laser beam is projected across the roadway at a plurality of different elevations.

6. The method according to claim 5 wherein the single laser beam comprises a continuous vertically-oriented beam.

7. The method according to claim 1 further including the step of determining the horizontal distance of the crown from a known reference.

8. The method according to claim 7 further including the step of calculating the coordinate position of the crown.

9. The method according to claim 7 wherein the step of determining the horizontal distance of the crown from a known reference includes using an optical detector to measure the angle between the crown and the known reference.

10. A method for surveying a roadway having a crown comprising:
    a) projecting a laser beam horizontally across said roadway from one side thereof at a plurality of different elevations;
    b) detecting the laser beam on the opposite side of the roadway at elevations which are not obstructed by the roadway; and
    c) determining the elevation of the crown based on the elevation of the detected and/or non-detected beams.

11. The method according to claim 10 wherein a plurality of laser beams are projected across said roadway at a plurality of different elevations.

12. The method according to claim 10 further including the steps of detecting the crown of said roadway using an optical detector and determining the horizontal distance of said crown from a known point based on information provided by said optical detector.

13. The method according to claim 10 further including the step of calculating the coordinate position of the crown.

14. The method according to claim 12 wherein the optical detector is positioned at a known elevation at one edge of said roadway and wherein the information provided by the optical detector includes the angle between said crown and a known reference.

15. A method for surveying a roadway having a crown comprising:
 a) projecting a vertically-oriented laser array horizontally across said roadway from one side thereof so that the vertical array is partially occluded by said roadway;
 b) detecting the non-occluded portion of said laser array on the opposite side of said roadway; and
 c) determining the elevation of the crown based on the elevation of either the detected or non-detected portion of said laser array.

16. The method according to claim 15 wherein said laser array is a continuous, vertically-oriented beam.

17. The method according to claim 15 wherein said laser array is a plurality of discrete, vertically-spaced laser beams.

18. The method according to claim 15 wherein a plurality of laser beams are projected across said roadway at a plurality of different elevations.

19. The method according to claim 15 further including the steps of detecting the crown of said roadway using an optical detector and determining the horizontal distance of said crown from a known point based on information provided by said optical detector.

20. The method according to claim 15 further including the step of calculating the coordinate position of the crown.

21. The method according to claim 19 wherein the optical detector is positioned at a known elevation at one edge of said roadway and wherein the information provided by the optical detector includes the angle between said crown and a known reference.

22. A method for surveying a roadway having a crown comprising:
 a) projecting a laser beam across said roadway from one side thereof;
 b) varying the angle of said laser beam with respect to a known reference;
 c) detecting the laser on the opposite side of said roadway as the angle is varied;
 d) determining the angle of the laser beam at the point where the beam is occluded by the crown; and
 e) using said angle to calculate the elevation of said crown.

23. The method according to claim 22 further including the steps of detecting the crown of said roadway using an optical detector and determining the horizontal distance of said crown from a known point based on information provided by said optical detector.

24. The method according to claim 23 wherein the optical detector is positioned at a known elevation at one edge of said roadway and wherein the information provided by the optical detector includes the angle between said crown and a known reference.

25. A method for determining the elevation of a break point in a roadway having varying slopes on either side of said break point, said method comprising:
 a) projecting a laser beam across said roadway so that it intersects a first slope on one side of said break point at two different points;
 b) projecting a laser beam across said roadway so that it intersects a second slope on the opposite side of said break point at two different points;
 c) determining the position of the laser beam at said points where it intersects the first and second slopes;
 d) using the position information to calculate the slope of the roadway on either side of the break point;
 e) calculating the elevation of the break point based on the calculated slope on either side of the break point.

26. The method according to claim 23 wherein the step of determining the position of the laser beam includes detecting the laser beam with an optical detector.

27. The method according to claim 26 further including the steps of detecting the crown of said roadway using an optical detector and determining the horizontal distance of said crown from a known point based on information provided by said optical detector.

28. The method according to claim 27 wherein the optical detector is positioned at a known elevation at one edge of said roadway and wherein the information provided by the optical detector includes the angle between said crown and a known reference.

* * * * *